United States Patent
Li et al.

(10) Patent No.: US 9,313,679 B2
(45) Date of Patent: Apr. 12, 2016

(54) METHOD FOR TRANSMITTING SOUNDING REFERENCE SIGNAL AND METHOD AND DEVICE FOR INDICATING CONFIGURATION

(71) Applicant: Huawei Technologies Co., Ltd., Shenzhen, Guangdong (CN)

(72) Inventors: Qiang Li, Beijing (CN); David Mazzarese, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 231 days.

(21) Appl. No.: 13/895,929

(22) Filed: May 16, 2013

(65) Prior Publication Data

US 2013/0250893 A1 Sep. 26, 2013

Related U.S. Application Data

(63) Continuation of application No. PCT/CN2011/075083, filed on Jun. 1, 2011.

(30) Foreign Application Priority Data

Nov. 16, 2010 (CN) .......................... 2010 1 0546458

(51) Int. Cl.
*H04W 24/10* (2009.01)
*H04L 1/00* (2006.01)
*H04L 1/08* (2006.01)
*H04L 5/00* (2006.01)

(52) U.S. Cl.
CPC .............. *H04W 24/10* (2013.01); *H04L 1/0031* (2013.01); *H04L 1/08* (2013.01); *H04L 5/0048* (2013.01); *H04L 5/0053* (2013.01); *H04L 5/0094* (2013.01)

(58) Field of Classification Search
None
See application file for complete search history.

(56) References Cited

U.S. PATENT DOCUMENTS

| 2010/0080187 A1 | 4/2010 | Papasakellariou et al. |
| 2012/0076037 A1* | 3/2012 | Noh et al. ................... 370/252 |
| 2013/0028134 A1* | 1/2013 | Wang et al. ................. 370/254 |

FOREIGN PATENT DOCUMENTS

| CN | 101572896 A | 11/2009 |
| CN | 101765134 A | 6/2010 |
| CN | 101827444 A | 9/2010 |

OTHER PUBLICATIONS

Written Opinion of the International Searching Authority in corresponding PCT Patent Application No. PCT/CN2011/075083 (Sep. 15, 2011).

(Continued)

*Primary Examiner* — Marcus R Smith
*Assistant Examiner* — Omeed D Rahgozar
(74) *Attorney, Agent, or Firm* — Leydig Voit & Mayer, Ltd

(57) ABSTRACT

A method for transmitting a sounding reference signal and a method and device for indicating a configuration are provided. A method for indicating a sounding reference signal configuration may include: generating at least two pieces of downlink control signaling DCI, where each of the at least two pieces of DCI includes a sounding reference signal SRS configuration information element; and transmitting the at least two pieces of DCI in a subframe to a terminal, so that the SRS configuration information elements in the at least two pieces of DCI are used to jointly indicate an SRS configuration. Solutions of embodiments of the present invention can improve accuracy and flexibility of indicating an SRS configuration.

18 Claims, 2 Drawing Sheets

(56) References Cited

OTHER PUBLICATIONS

International Search Report in corresponding PCT Patent Application No. PCT/CN2011/075083 (Sep. 15, 2011).

"3GPP TS 36.211—$3^{rd}$ Generation Partnership Project; Technical Specification Group Radio Access Network; Evolved Universal Terrestrial Radio Access (E-UTRA); Physical Channels and Modulation (Release 9)," Mar. 2010, Version 9.1.0, $3^{rd}$ Generation Partnership Project, Valbonne, France.

3GPP TS 36.213—$3^{rd}$ Generation Partnership Project; Technical Specification Group Radio Access Network; Evolved Universal Terrestrial Radio Access (E-UTRA); Physical layer procedures (Release 9), Sep. 2010, Version 9.3.0, $3^{rd}$ Generation Partnership Project, Valbonne, France.

"TSG-RAN WG1 #62bis; Details of dynamic aperiodic SRS," Oct. 2010, Agenda Item 6.5.2.1, Document R1-105333, $3^{rd}$ Generation Partnership Project, Valbonne, France.

"3GPP TSG RAN WG1 #62bis; Resources for Dynamic SRS Multiplexing," Oct. 2010, Agenda Item 6.5.2.1, Document R1-1-5398, $3^{rd}$ Generation Partnership Project, Valbonne, France.

\* cited by examiner

METHOD FOR TRANSMITTING SOUNDING REFERENCE SIGNAL AND METHOD AND DEVICE FOR INDICATING CONFIGURATION

CROSS-REFERENCE TO RELATED APPLICATIONS

This application is a continuation of International Patent Application No. PCT/CN2011/075083, filed on Jun. 1, 2011, which claims priority to Chinese Patent Application No. 201010546458.9, filed on Nov. 16, 2010, both of which are hereby incorporated by reference in their entireties.

TECHNICAL FIELD

The present invention relates to the field of communication technologies, and in particular, to a method for indicating a sounding reference signal configuration, a method for transmitting a sounding reference signal, a radio access device, and a terminal device.

BACKGROUND

In a process of communication between a terminal (UE, User equipment) and a base station (eNB), a sounding reference signal (SRS, sounding reference signal) is a signal transmitted by the UE to the base station. Content of the SRS is known to both the terminal and the base station. After receiving the SRS transmitted by the terminal, the base station may measure a radio channel between the terminal and the base station according to the received SRS.

In systems such as a long-term evolution advanced (LTE-A, Long Term Evolution Advanced) system, the base station may instruct, through a physical downlink control channel (PDCCH, Physical Downlink Control Channel), the terminal to transmit a sounding reference signal.

The terminal acquires the following SRS configuration parameters to accurately transmit the SRS:
  SRS transmission time;
  frequency domain position for SRS transmission;
  SRS bandwidth;
  SRS hopping bandwidth;
  cyclic shift (CS, cyclic shift) used by the SRS;
  comb (comb) used by the SRS; and
  the number of antenna ports used for SRS transmission To notify the above SRS configuration parameters to the terminal, the base station may use the PDCCH to deliver the SRS configuration parameters to the terminal. However, because there is a large amount of information, while resources of the PDCCH are relatively precious, actually the base station may first deliver part of SRS configuration information to the terminal in advance through higher layer signaling (RRC signaling), and deliver the remaining configuration parameters through the PDCCH. In this way, the overhead of the PDCCH is relatively small. For example, the base station may notify the transmission time, frequency domain position, bandwidth, hopping bandwidth, and so on to the terminal through the higher layer signaling, and then notify trigger information (whether to trigger the terminal), cyclic shift information, and comb information to the terminal through the PDCCH.

Downlink control signaling (DCI, Downlink control signaling) refers to signaling transmitted on the PDCCH. DCI may be classified into multiple formats (DCI formats), and each format may bear different control signaling. The DCI of each format may include multiple information elements (IEs, information elements), where each IE carries control information of a different function. DCI of some formats includes SRS configuration information elements (namely, one or more bits for triggering an SRS) used for bearing SRS configuration information, while DCI of some formats does not include SRS configuration information elements and thus has no function of triggering an SRS.

In some application scenarios, in a subframe, an eNB may transmit multiple pieces of DCI to a UE, where at least two pieces of DCI have information elements for bearing SRS configuration information. In this case, how a base station triggers a UE to transmit an SRS to avoid confusion is a problem to be studied.

SUMMARY

Embodiments of the present invention provide a method for transmitting a sounding reference signal and a method and device for indicating a configuration, so as to improve accuracy and flexibility of indicating an SRS configuration.

To solve the preceding technical problem, embodiments of the present invention provide the following technical solutions:

A method for indicating a sounding reference signal configuration includes:
  generating at least two pieces of downlink control signaling DCI, where each of the at least two pieces of DCI includes a sounding reference signal SRS configuration information element; and
  transmitting the at least two pieces of DCI in a subframe to a terminal, so that the SRS configuration information elements in the at least two pieces of DCI are used to jointly indicate an SRS configuration.

A method for transmitting a sounding reference signal includes:
  receiving at least two pieces of DCI delivered in a subframe by a radio access device, where each of the at least two pieces of DCI includes a sounding reference signal SRS configuration information element;
  determining an SRS configuration indicated jointly by the SRS configuration information elements in the at least two pieces of DCI; and
  transmitting an SRS to the radio access device according to the determined SRS configuration.

A radio access device includes:
  a generating module, configured to generate at least two pieces of DCI, where each of the at least two pieces of DCI includes a sounding reference signal SRS configuration information element; and
  a transmitting module, configured to transmit the at least two pieces of DCI in a subframe to a terminal, so that the SRS configuration information elements in the at least two pieces of DCI are used to jointly indicate an SRS configuration.

A terminal device includes:
  a receiving module, configured to receive at least two pieces of DCI delivered in a subframe by a radio access device, where each of the at least two pieces of DCI includes a sounding reference signal SRS configuration information element;
  a determining module, configured to determine an SRS configuration indicated jointly by the SRS configuration information elements in the at least two pieces of DCI received by the receiving module; and
  a transmitting module, configured to transmit an SRS to the radio access device according to the SRS configuration determined by the determining module.

As seen above, the radio access device in the embodiments of the present invention generates at least two pieces of DCI and transmits the at least two pieces of DCI in a same subframe to the terminal, so as to use the SRS configuration information elements in the at least two pieces of DCI to jointly indicate an SRS configuration. Because the radio access device uses the SRS configuration information elements in multiple pieces of DCI to jointly indicate an SRS configuration, the SRS configuration information elements in the multiple pieces of DCI may be coordinated to indicate a uniquely determined SRS configuration, and accuracy and flexibility of indicating an SRS configuration may be improved.

BRIEF DESCRIPTION OF DRAWINGS

To describe the technical solutions in the embodiments of the present invention or the prior art more clearly, the following briefly introduces the accompanying drawings required for describing the embodiments of the present invention or the prior art. Apparently, the accompanying drawings in the following description show merely some embodiments of the present invention, and persons of ordinary skill in the art may still derive other drawings from the accompanying drawings without creative efforts.

DESCRIPTION OF EMBODIMENTS

Figure 1:
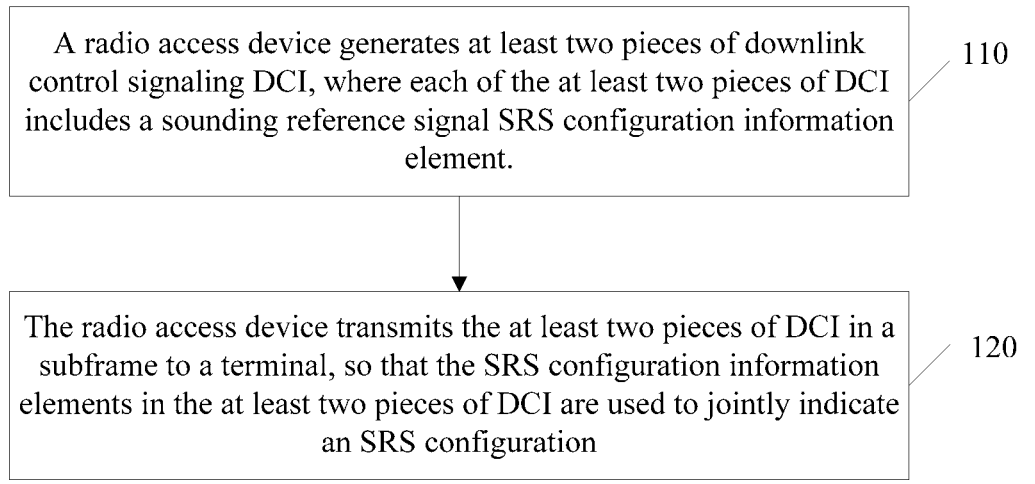
FIG. 1 is a schematic flowchart of a method for indicating an SRS configuration according to a first embodiment of the present invention.
Figure 2:
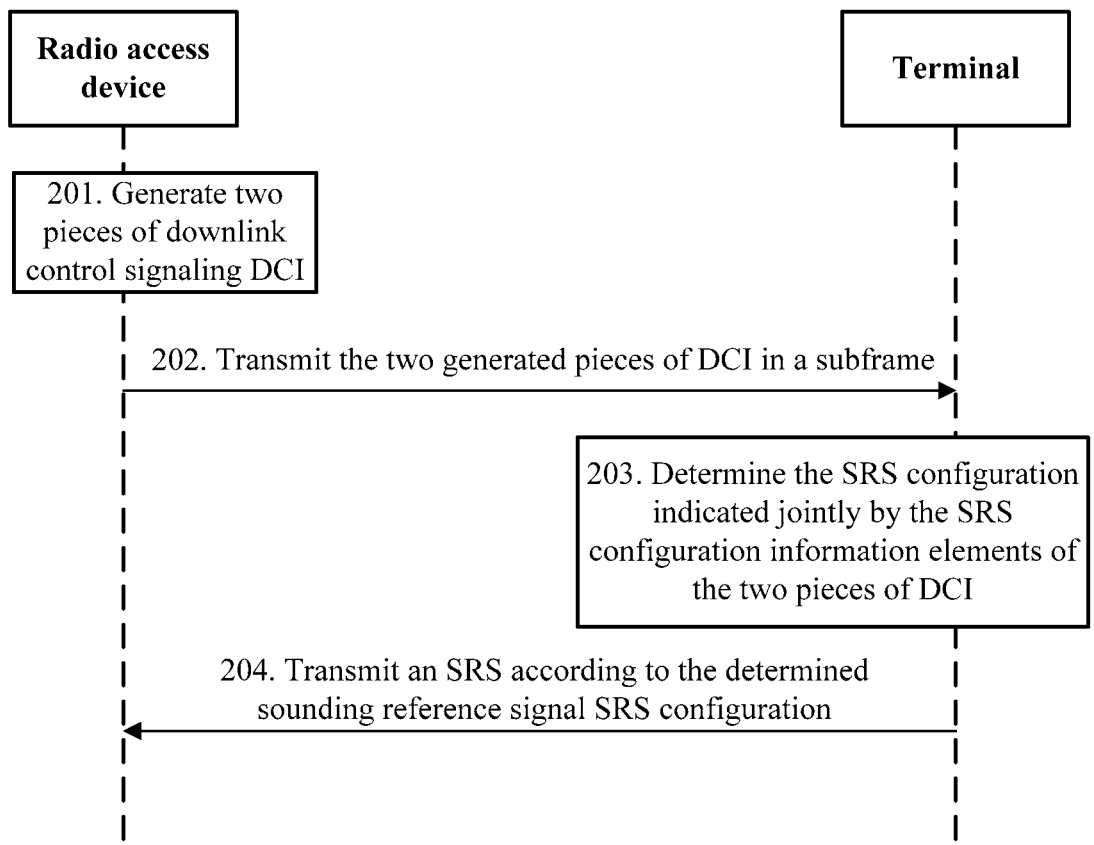
FIG. 2 is a schematic flowchart of a method for indicating an SRS configuration according to a second embodiment of the present invention.

Embodiments of the present invention provide a method for transmitting a sounding reference signal SRS and a method, device, and system for indicating a configuration, so as to improve accuracy and flexibility of indicating an SRS configuration.

To help those skilled in the art better understand the solutions of the present invention, the following describes the technical solutions provided by the embodiments of the present invention clearly and completely with reference to the accompanying drawings. Evidently, the described embodiments are only some exemplary embodiments of the present invention, rather than all embodiments of the present invention. All other embodiments that persons of ordinary skill in the art derive without creative efforts based on the embodiments of the present invention shall fall within the protection scope of the present invention.

First, it is noted that a radio access device in an embodiment of the present invention refers to an entity that can implement a radio access management function for a user equipment, and the radio access device may have different names, positions, and product forms in different networks.

For example, the radio access device mentioned in the following embodiments of the present invention may refer to: an evolved NodeB (eNodeB), a home NodeB (HeNB), or other types of base stations in an evolved universal mobile telecommunications system (UMTS, Universal Mobile Telecommunications System) terrestrial radio access network (E-UTRAN, Evolved UMTS Territorial Radio Access Network); or a base station controller or a radio network controller (RNC, Radio Network Controller) in a UMTS terrestrial radio access network (UTRAN, UMTS Territorial Radio Access Network)/GSM EDGE radio access network (GERAN, GSM EDGE Radio Access Network); or may refer to an entity having an access network logical function of a high rate packet data access network (HRPD-AN, High Rate Packet Data Access Network) in a wideband code division multiple access (CDMA, Code Division Multiple Access) network, or an entity having an access network logical function of an evolved packet data gateway (EPDG, Evolved Packet Data Gateway) in a wireless local area network (WLAN, Wireless Local Area Network); or an access service network base station (ASN-BS, Access Service Network Base Station) in a worldwide interoperability for microwave access (WiMAX, Worldwide Interoperability for Microwave Access) network or an entity for implementing radio access management of a terminal in other networks.

Embodiment 1

A method for delivering sounding reference signal configuration information according to an embodiment of the present invention may include: generating at least two pieces of downlink control signaling DCI, where each of the at least two pieces of DCI includes a sounding reference signal SRS configuration information element; and transmitting the at least two pieces of DCI in a subframe to a terminal, so that the SRS configuration information elements in the at least two pieces of DCI are used to jointly indicate an SRS configuration.

As shown in FIG. 1, the specific steps may include:

110. A radio access device generates at least two pieces of DCI, where each of the at least two pieces of DCI includes a sounding reference signal SRS configuration information element.

In an actual application, when a radio access device needs to measure (for example, measure channel quality) a radio channel between the radio access device and a terminal, the radio access device may specify SRS configuration parameters for the terminal; and the terminal may transmit an SRS to the radio access device according to the SRS configuration parameters specified by the radio access device.

The radio access device may use SRS configuration information elements in at least two pieces of downlink control signaling DCI to jointly indicate one or more of the following SRS configuration parameters: SRS transmission time, frequency domain position for SRS transmission, SRS bandwidth, SRS hopping bandwidth, cyclic shift used by the SRS, comb used by the SRS, and the number of SRS antenna ports. Formats (formats) of the at least two pieces of downlink control signaling DCI may be the same or different.

The terminal and the radio access device may pre-agree mapping relationships between different values of SRS configuration information elements and SRS configurations in different combinations (including a combination of DCI in different quantities and/or DCI of different formats). The SRS configuration information element may be regarded as an IE which is used for carrying SRS configuration information and is in DCI, and positions of SRS configuration information elements in DCI of different formats may be the same or different.

In an actual application, there are various methods for using the SRS configuration information elements in the at least two generated pieces of DCI by the radio access device to jointly indicate an SRS configuration, for example, using a joint encoding result of the SRS configuration information elements in the at least two pieces of DCI generated according to a preset joint encoding rule to jointly indicate an SRS configuration, and joining and combining the SRS configuration information elements in the at least two pieces of DCI (the order of joining and combining may be agreed or indicated), where different values of multiple joined and combined bits correspondingly indicate corresponding SRS configurations (for example, joining and combining SRS configuration information elements of 3 bits included in two pieces of DCI, where different values of the 3 joined and combined bits may indicate at most 8 different SRS configurations); or using an SRS configuration indicated by the SRS configuration information element of one piece (or more pieces) of DCI in the at least two generated pieces of DCI (while the SRS configuration information elements in the remaining DCI are set to invalid, or are used as a reference condition for determining whether the jointly indicated SRS configuration is valid) as the SRS configuration jointly indicated by the SRS configuration information elements in the at least two generated pieces of DCI. However, no matter which combined indication method is selected, because the SRS configuration information elements in the at least two pieces of DCI are used for joint indication, the SRS configuration information elements in the at least two pieces of DCI may be coordinated and unified to indicate a uniquely determined SRS configuration (which may be valid or invalid), and two parties may finally obtain a determined indication result according to an agreed mapping relationship which does not cause configuration confusion.

For example, the radio access device may generate at least two pieces of DCI having different indication priorities, and use the SRS configuration information element of DCI of the highest indication priority in the at least two pieces of DCI to indicate an SRS configuration, that is, use an SRS configuration indicated by the SRS configuration information element of DCI of the highest indication priority in the at least two pieces of DCI having different indication priorities as the SRS configuration jointly indicated by the SRS configuration information elements in the at least two pieces of DCI having different indication priorities, while the SRS configuration information elements of other DCI than the DCI of the highest indication priority in the at least two pieces of DCI may be regarded as invalid.

In addition, when the SRS configuration information elements of other DCI than DCI of the highest indication priority in the at least two pieces of DCI and the SRS configuration information element of DCI of the highest indication priority indicate a same SRS configuration, the same SRS configuration is used as the SRS configuration jointly indicated by the SRS configuration information elements in the at least two pieces of DCI; and when the SRS configuration information elements of other DCI than DCI of the highest indication priority in the at least two pieces of DCI and the SRS configuration information element of DCI of the highest indication priority indicate different SRS configurations, the SRS configuration information elements in the at least two pieces of DCI jointly indicate an invalid SRS configuration.

For another example, the radio access device may generate at least two pieces of DCI of different indication priorities, where: if the SRS configuration information elements of other DCI than DCI of the highest indication priority in the at least two pieces of DCI having different indication priorities are set to an invalid state (for example, an off state or other agreed invalid states), namely, a state indicating no SRS configuration, the SRS configuration indicated by the SRS configuration information element of DCI of the highest indication priority may be used as the SRS configuration jointly indicated by the SRS configuration information elements in the at least two pieces of DCI having different indication priorities; and when the SRS configuration information elements of other DCI than DCI of the highest indication priority in the at least two pieces of DCI also indicate an SRS configuration, the SRS configuration information elements in the at least two pieces of DCI jointly indicate an invalid SRS configuration.

For another example, the radio access device may generate at least two pieces of DCI of the same or different formats, where: when the SRS configuration information element of only one piece of DCI in the at least two pieces of DCI indicates an SRS configuration (the SRS configuration information elements of the remaining DCI are in an invalid state), the SRS configuration indicated by the SRS configuration information element of the only one piece of DCI is used as the SRS configuration jointly indicated by the SRS configuration information elements in the at least two pieces of DCI; and when the SRS configuration information elements of the at least two pieces of DCI all indicate an SRS configuration, the SRS configuration information elements in the at least two pieces of DCI jointly indicate an invalid SRS configuration.

For another example, the radio access device may generate at least two pieces of DCI of the same or different formats, where: when the SRS configuration information element of only one piece of DCI in the at least two pieces of DCI indicates an SRS configuration (the SRS configuration information elements of the remaining DCI are in an invalid state), the SRS configuration indicated by the SRS configuration information element of the only one piece of DCI is used as the SRS configuration jointly indicated by the SRS configuration information elements in the at least two pieces of DCI; when the SRS configuration information elements of the at least two pieces of DCI all indicate a same SRS configuration, the same SRS configuration is used as the SRS configuration jointly indicated by the SRS configuration information elements in the at least two pieces of DCI; and when the SRS configuration information elements of the at least two pieces of DCI indicate different SRS configurations, the SRS configuration information elements in the at least two pieces of DCI jointly indicate an invalid SRS configuration.

For another example, the radio access device may generate two pieces of DCI of the same or different formats, where: if an SRS configuration indicated by the SRS configuration information element of one piece of DCI in the two pieces of DCI is an SRS configuration in SRS configurations that can be indicated by the SRS configuration information element of the other piece of DCI, then, when the SRS configuration information element of the one piece of DCI and the SRS configuration information element of the other piece of DCI indicate a same SRS configuration, the same SRS configuration is used as the SRS configuration jointly indicated by the SRS configuration information elements in the two pieces of DCI, and when the SRS configuration information element of the one piece of DCI and the SRS configuration information of the other piece of DCI indicate different SRS configurations, the SRS configuration information elements in the two pieces of DCI jointly indicate an invalid SRS configuration; and if an SRS configuration indicated by the SRS configuration information element of one piece of DCI in the two pieces of DCI is an SRS configuration that cannot be indicated by the SRS configuration information element of the other piece of DCI, then, when the SRS configuration information element of the other piece of DCI indicates an SRS configuration, the SRS configuration information elements in the two pieces of DCI jointly indicate an invalid SRS configuration, and when the SRS configuration information element of the other piece of DCI is set to an invalid state, the SRS configuration indicated by the SRS configuration information element of the one piece of DCI is used as the SRS configuration jointly indicated by the SRS configuration information elements in the two pieces of DCI.

It may be understood that in an actual application, the method for using SRS configuration information elements of at least two pieces of DCI to jointly indicate an SRS configuration is not limited to the above methods.

It should be noted that herein the SRS configuration refers to the specific setting of a group of SRS parameters, for example, other SRS parameters are all configured by the radio access device by using higher layer signaling, and only the SRS parameters such as comb and CS need to be configured at a physical layer. In this case, one SRS configuration may refer to (comb0, CS0), and another SRS configuration may refer to (comb1, CS4), and so on.

120. The radio access device transmits the at least two pieces of DCI in a subframe to a terminal, so that the SRS configuration information elements in the at least two pieces of DCI are used to jointly indicate an SRS configuration.

In an actual application, the radio access device may transmit the at least two pieces of DCI in a same subframe to the terminal, so that the terminal can receive the at least two pieces of DCI simultaneously as much as possible.

After the terminal obtains the at least two pieces of DCI by parsing from a PDCCH of the same subframe, the terminal may determine, in combination with values of the SRS configuration information elements of the at least two pieces of DCI according to a preset mapping relationship, an SRS configuration jointly indicated by the SRS configuration information elements of the at least two pieces of DCI, and transmit an SRS to the radio access device according to the determined SRS configuration.

In addition, if the radio access device transmits part of SRS configuration parameters through higher layer signaling beforehand, then, if the UE receives at least two pieces of DCI from the PDCCH of the same subframe and the at least two pieces of DCI instruct the UE to transmit an SRS, the UE may combine the part of SRS configuration parameters transmitted by the radio access device through higher layer signaling beforehand and the SRS configuration parameters indicated by the DCI currently received from the PDCCH, to determine a whole SRS configuration, and transmit an SRS according to the determined SRS configuration parameters.

The following describes, from the perspective of a terminal, a method for transmitting a sounding reference signal.

A method for transmitting a sounding reference signal according to an embodiment of the present invention may include: receiving at least two pieces of DCI delivered in a same subframe by a radio access device, where each of the at least two pieces of DCI includes a sounding reference signal SRS configuration information element; determining an SRS configuration jointly indicated by the SRS configuration information elements in the at least two pieces of DCI; and transmitting an SRS to the radio access device according to the determined SRS configuration.

In an application scenario, if the at least two pieces of DCI have different indication priorities, the terminal may compare the indication priorities of the at least two pieces of DCI; and determine, according to the comparison, an SRS configuration indicated by the SRS configuration information element of DCI of the highest indication priority in the at least two pieces of DCI as the SRS configuration jointly indicated by the SRS configuration information elements in the at least two pieces of DCI.

In another application scenario, if the terminal receives at least two pieces of DCI having different indication priorities, the terminal may compare the indication priorities of the at least two pieces of DCI; and if the SRS configuration information elements of other DCI than DCI of the highest indication priority in the at least two pieces of DCI are set to an invalid state (for example, an off state or other agreed invalid states), determine, according to the comparison, an SRS configuration indicated by the SRS configuration information element of DCI of the highest indication priority in the at least two pieces of DCI as the SRS configuration jointly indicated by the SRS configuration information elements in the at least two pieces of DCI. In addition, if the SRS configuration information elements of other DCI than DCI of the highest indication priority in the at least two pieces of DCI are set to a valid state (namely, a state indicating an SRS configuration), the terminal may determine an indication error, that is, determine that the SRS configuration information elements in the at least two pieces of DCI jointly indicate an invalid SRS configuration. When an SRS configuration indication error is determined, the terminal generally does not transmit an SRS.

In another application scenario, if the terminal receives at least two pieces of DCI having different indication priorities, the terminal may compare the indication priorities of the at least two pieces of DCI; and if the SRS configuration information elements of other DCI than DCI of the highest indication priority in the at least two pieces of DCI are set to an invalid state (for example, an off state or other agreed invalid states), determine, according to the comparison, an SRS configuration indicated by the SRS configuration information element of DCI of the highest indication priority in the at least two pieces of DCI as the SRS configuration jointly indicated by the SRS configuration information elements in the at least two pieces of DCI. In addition, if the SRS configuration information elements of other DCI than DCI of the highest indication priority in the at least two pieces of DCI are set to a valid state (namely, a state indicating an SRS configuration), the terminal may further determine whether the SRS configuration information element of DCI of the highest indication priority and the SRS configuration information elements of other DCI than DCI of the highest indication priority indicate a same SRS configuration, and if so, determine that the same SRS configuration is the SRS configuration jointly indicated by the SRS configuration information elements in the at least two pieces of DCI; if not (namely, the SRS configuration information elements of the at least two pieces of DCI indicate different SRS configurations), determine that the SRS configuration information elements in the at least two pieces of DCI jointly indicate an invalid SRS configuration.

In another application scenario, if the terminal receives at least two pieces of DCI of the same or different formats, the terminal may determine whether the SRS configuration information element of only one piece of DCI in the at least two pieces of DCI indicates an SRS configuration (that is, the SRS configuration information elements of the remaining DCI are in an invalid state), and if so, determine the SRS configuration indicated by the SRS configuration information element of the only one piece of DCI as the SRS configuration jointly indicated by the SRS configuration information elements in the at least two pieces of DCI; if not (that is, when the SRS configuration information elements of the at least two pieces of DCI all indicate an SRS configuration), determine that the SRS configuration information elements in the at least two pieces of DCI jointly indicate an invalid SRS configuration.

In another application scenario, if the terminal receives at least two pieces of DCI of the same or different formats, the terminal may determine whether the SRS configuration information element of only one piece of DCI in the at least two pieces of DCI indicates an SRS configuration (the SRS configuration information elements of the remaining DCI are in an invalid state), and if so, determine the SRS configuration indicated by the SRS configuration information element of the only one piece of DCI as the SRS configuration jointly indicated by the SRS configuration information elements in the at least two pieces of DCI; if not (that is, when the SRS configuration information elements of the at least two pieces of DCI all indicate an SRS configuration), further determine whether the SRS configuration information elements of the at least two pieces of DCI indicate a same SRS configuration, and if so, determine that the same SRS configuration is the SRS configuration jointly indicated by the SRS configuration information elements in the at least two pieces of DCI; if not (that is, the SRS configuration information elements of the at least two pieces of DCI indicate different SRS configurations), determine that the SRS configuration information elements in the at least two pieces of DCI jointly indicate an invalid SRS configuration.

In another application scenario, if the terminal receives two pieces of DCI of the same or different formats, and an SRS configuration indicated by the SRS configuration information element of one piece of DCI in the two pieces of DCI is an SRS configuration in SRS configurations that can be indicated by the SRS configuration information element of the other piece of DCI, the terminal may determine whether the SRS configuration information element of the one piece of DCI and the SRS configuration information element of the other piece of DCI indicate a same SRS configuration, and if so, determine that the same SRS configuration is the SRS configuration jointly indicated by the SRS configuration information elements in the two pieces of DCI; if not (that is, the SRS configuration information element of the one piece of DCI and the SRS configuration information of the other piece of DCI indicate different SRS configurations), determine that the SRS configuration information elements in the two pieces of DCI jointly indicate an invalid SRS configuration. In addition, if an SRS configuration indicated by the SRS configuration information element of one piece of DCI in the two pieces of DCI is an SRS configuration that cannot be indicated by the SRS configuration information element of the other piece of DCI, the terminal may further determine whether the SRS configuration information element of the other piece of DCI also indicates an SRS configuration, and if so, determine that the SRS configuration information elements in the two pieces of DCI jointly indicate an invalid SRS configuration; if not (that is, when the SRS configuration information element of the other piece of DCI is set to an invalid state), determine the SRS configuration indicated by the SRS configuration information element of the one piece of DCI as the SRS configuration jointly indicated by the SRS configuration information elements in the two pieces of DCI.

It may be understood that in an actual application, the agreed method for using the SRS configuration information elements of at least two pieces of DCI to jointly indicate an SRS configuration is not limited to the above agreed method between the terminal and the radio access device. Of course, other agreed methods may also be selected to use SRS configuration information elements of at least two pieces of DCI to jointly indicate an SRS configuration, and are not further enumerated herein.

The embodiment of the present invention is applicable to an LTE system, an LTE-A system, or other evolved systems. It should be noted that the radio access device mentioned in the embodiment of the present invention may be, for example, an evolved NodeB (eNB), an ordinary NodeB (NodeB) (various NodeBs may be collectively called base stations), or other devices having a radio access function.

As seen above, the radio access device in the embodiment generates at least two pieces of DCI and transmits the at least two pieces of DCI in a same subframe to the terminal, so as to use the SRS configuration information elements in the at least two pieces of DCI to jointly indicate an SRS configuration. Because the radio access device uses the SRS configuration information elements in multiple pieces of DCI to jointly indicate an SRS configuration, the SRS configuration information elements in the multiple pieces of DCI may be coordinated to indicate a uniquely determined SRS configuration, and accuracy and flexibility of indicating an SRS configuration may be improved.

Embodiment 2

For better understanding the technical solution of the embodiment of the present invention, the following provides detailed description by using a method as an example, where in the method, a radio access device uses SRS configuration information elements of two pieces of DCI of different formats to jointly indicate an SRS configuration.

201. A radio access device generates two pieces of DCI, where each of the two pieces of DCI includes a sounding reference signal SRS configuration information element.

The information formats of the two pieces of DCI may be the same or different.

In an actual application, when the radio access device needs to measure channel quality of the current radio channel between the radio access device and a terminal, the radio access device may specify SRS configuration parameters for the terminal; and the terminal may transmit an SRS according to the SRS configuration parameters specified by the radio access device.

The radio access device may perform joint encoding on SRS configuration information elements of two pieces of DCI to jointly indicate one or more of the following SRS configuration parameters: SRS transmission time, frequency domain position for SRS transmission, SRS bandwidth, SRS hopping bandwidth, cyclic shift used by the SRS, comb used by the SRS, and the number of SRS antenna ports.

The terminal and the radio access device may pre-agree mapping relationships between different values and SRS configurations in different combinations (including a combination of DCI in different quantities and/or DCI of different formats).

202. The radio access device transmits the two pieces of DCI in a subframe to a terminal, so that the SRS configuration information elements in the two pieces of DCI are used to jointly indicate an SRS configuration.

203. The terminal receives the two pieces of DCI delivered by the radio access device, and determines the SRS configuration indicated jointly by the SRS configuration information elements of the two pieces of DCI.

In an actual application, the radio access device may transmit two pieces of DCI in a same subframe to the terminal, so that the terminal can receive the two pieces of DCI simultaneously as much as possible.

After the terminal obtains the two pieces of DCI by parsing from a PDCCH of the same subframe, the terminal may determine, in combination with values of SRS configuration information elements of the two pieces of DCI, an SRS configuration jointly indicated by the SRS configuration information elements of the two pieces of DCI.

In addition, if the radio access device delivers part of SRS configuration parameters through higher layer signaling beforehand, then, if the UE receives two pieces of DCI from the PDCCH of the same subframe and the two pieces of DCI instruct the UE to transmit an SRS, the UE may combine the part of SRS configuration parameters delivered by the radio access device through higher layer signaling beforehand and the SRS configuration parameters indicated by the DCI currently received from the PDCCH, to determine a whole SRS configuration, and transmit an SRS according to the determined SRS configuration parameters.

In an actual application, there are various methods for using the SRS configuration information elements in the two generated pieces of DCI by the radio access device to jointly indicate an SRS configuration, for example, using a joint encoding result of the SRS configuration information elements in the two pieces of DCI generated according to a preset joint encoding rule to jointly indicate an SRS configuration, and joining and combining the SRS configuration information elements in the two pieces of DCI (the order of joining and combining may be agreed or indicated), where different values of multiple joined and combined bits correspondingly indicate corresponding SRS configurations (for example, joining and combining SRS configuration information elements of 3 bits included in two pieces of DCI, where different values of the 3 joined and combined bits may indicate at most 8 different SRS configurations); or using an SRS configuration indicated by the SRS configuration information element of one piece (or more pieces) of DCI in the two generated pieces of DCI (while the SRS configuration information element in the remaining DCI is set to invalid, or is used as a reference condition for determining whether the jointly indicated SRS configuration is valid) as the SRS configuration jointly indicated by the SRS configuration information elements in the two generated pieces of DCI. However, no matter which combined indication method is selected, because the SRS configuration information elements in the two pieces of DCI are used for joint indication, the SRS configuration information elements in the two pieces of DCI may be coordinated and unified to indicate a uniquely determined SRS configuration (which may be valid or invalid), and two parties may finally obtain a determined indication result according to an agreed mapping relationship which does not cause configuration confusion.

For example, the radio access device may generate two pieces of DCI having different indication priorities, and use the SRS configuration information element of DCI of the highest indication priority in the two pieces of DCI to indicate an SRS configuration, that is, use an SRS configuration indicated by the SRS configuration information element of DCI of the highest indication priority in the two pieces of DCI having different indication priorities as the SRS configuration jointly indicated by the SRS configuration information elements in the two pieces of DCI having different indication priorities, while the SRS configuration information element of other DCI than the DCI of the highest indication priority in the two pieces of DCI may be regarded as invalid. In the application scenario, if the two pieces of DCI received by the terminal have different indication priorities, the terminal may compare the indication priorities of the two pieces of DCI; and determine, according to the comparison, an SRS configuration indicated by the SRS configuration information element of DCI of the highest indication priority in the two pieces of DCI as the SRS configuration jointly indicated by the SRS configuration information elements in the two pieces of DCI.

In addition, when the SRS configuration information element of other DCI than DCI of the highest indication priority in the two pieces of DCI and the SRS configuration information element of DCI of the highest indication priority indicate a same SRS configuration, the same SRS configuration is used as the SRS configuration jointly indicated by the SRS configuration information elements in the two pieces of DCI; and when the SRS configuration information element of other DCI than DCI of the highest indication priority in the two pieces of DCI and the SRS configuration information element of DCI of the highest indication priority indicate different SRS configurations, the SRS configuration information elements in the two pieces of DCI jointly indicate an invalid SRS configuration.

For another example, the radio access device may generate two pieces of DCI of different indication priorities, where: if the SRS configuration information element of other DCI than DCI of the highest indication priority in the two pieces of DCI having different indication priorities is set to an invalid state (for example, an off state or other agreed invalid states), namely, a state indicating no SRS configuration, the SRS configuration indicated by the SRS configuration information element of DCI of the highest indication priority may be used as the SRS configuration jointly indicated by the SRS configuration information elements in the two pieces of DCI having different indication priorities; and when the SRS configuration information element of other DCI than DCI of the highest indication priority in the two pieces of DCI also indicates an SRS configuration, the SRS configuration information elements in the two pieces of DCI jointly indicate an invalid SRS configuration.

For another example, the radio access device may generate two pieces of DCI of the same or different formats, where: when the SRS configuration information element of only one piece of DCI in the two pieces of DCI indicates an SRS configuration (the SRS configuration information element of the remaining DCI is in an invalid state), the SRS configuration indicated by the SRS configuration information element of the one piece of DCI is used as the SRS configuration jointly indicated by the SRS configuration information elements in the two pieces of DCI; and when the SRS configuration information elements of the two pieces of DCI both indicate an SRS configuration, the SRS configuration information elements in the two pieces of DCI jointly indicate an invalid SRS configuration.

For another example, the radio access device may generate two pieces of DCI of the same or different formats, where: when the SRS configuration information element of only one piece of DCI in the two pieces of DCI indicates an SRS configuration (the SRS configuration information element of the remaining DCI is in an invalid state), the SRS configuration indicated by the SRS configuration information element of the one piece of DCI is used as the SRS configuration jointly indicated by the SRS configuration information elements in the two pieces of DCI; when the SRS configuration information elements of the two pieces of DCI both indicate a same SRS configuration, the same SRS configuration is used as the SRS configuration jointly indicated by the SRS configuration information elements in the two pieces of DCI; and when the SRS configuration information elements of the two pieces of DCI indicate different SRS configurations, the SRS configuration information elements in the two pieces of DCI jointly indicate an invalid SRS configuration.

For another example, the radio access device may generate two pieces of DCI of the same or different formats, where: if an SRS configuration indicated by the SRS configuration information element of one piece of DCI in the two pieces of DCI is an SRS configuration in SRS configurations that can be indicated by the SRS configuration information element of the other piece of DCI, then, when the SRS configuration information element of the one piece of DCI and the SRS configuration information element of the other piece of DCI indicate a same SRS configuration, the same SRS configuration is used as the SRS configuration jointly indicated by the SRS configuration information elements in the two pieces of DCI, and when the SRS configuration information element of the one piece of DCI and the SRS configuration information of the other piece of DCI indicate different SRS configurations, the SRS configuration information elements in the two pieces of DCI jointly indicate an invalid SRS configuration; and if an SRS configuration indicated by the SRS configuration information element of one piece of DCI in the two pieces of DCI is an SRS configuration that cannot be indicated by the SRS configuration information element of the other piece of DCI, then, when the SRS configuration information element of the other piece of DCI indicates an SRS configuration, the SRS configuration information elements in the two pieces of DCI jointly indicate an invalid SRS configuration, and when the SRS configuration information element of the other piece of DCI is set to an invalid state, the SRS configuration indicated by the SRS configuration information element of the one piece of DCI may be used as the SRS configuration jointly indicated by the SRS configuration information elements in the two pieces of DCI.

The terminal may determine, according to the mapping relationship corresponding thereto, an SRS configuration jointly indicated by the SRS configuration information elements in the two pieces of DCI.

It may be understood that in an actual application, the method for using SRS configuration information elements of two pieces of DCI to jointly indicate an SRS configuration is not limited to the above methods.

204. The terminal transmits an SRS to the radio access device according to the determined SRS configuration.

The radio access device may receive the SRS transmitted by the terminal, and measure channel quality of the current radio channel between the radio access device and the terminal according to the received SRS.

For ease of understanding and implementation, the following uses several specific instances to describe the method for joint encoding of SRS configuration information elements in multiple pieces of DCI in the embodiment of the present invention.

For example, it is assumed that DCI of three formats (formats) has SRS configuration information elements (namely, has a capability of triggering an SRS), where the three formats are called format 0, format 4, and format 1a, respectively, where DCI of format 4 has a 2-bit SRS configuration information element, and DCI of format 0 and DCI of format 1a each have a 1-bit SRS configuration information element.

If DCI of format 4 is separately used for triggering, it is assumed that the mapping relationships between the value states of the SRS configuration information element and SRS configurations are shown in Table 1:

TABLE 1

| Value State | Configuration |
|---|---|
| 00 | Off |
| 01 | SRS configuration 1 |
| 10 | SRS configuration 2 |
| 11 | SRS configuration 3 |

If DCI of format 0 is separately used for triggering, it is assumed that the mapping relationships between the value states of the SRS configuration information element and SRS configurations are shown in Table 2:

TABLE 2

| State | Configuration |
|---|---|
| 0 | Off |
| 1 | SRS configuration 4 |

If DCI of format 1a is separately used for triggering, it is assumed that the mapping relationships between the value states of the SRS configuration information element and SRS configurations are shown in Table 3:

TABLE 3

| State | Configuration |
|---|---|
| 0 | Off |
| 1 | SRS configuration 5 |

It should be noted that multiple configurations (such as two configurations) in the SRS configurations mentioned herein may be the same SRS configuration, or may be several different SRS configurations, for example, SRS configuration 5 may be the same as an SRS configuration in SRS configurations 1-3 in Table 1, or may be a configuration different from all SRS configurations 1-3.

It should be noted that herein the SRS configuration refers to the specific setting of a group of SRS parameters, for example, other SRS parameters are configured by the radio access device by using higher layer signaling, and only the SRS parameters such as comb and CS need to be configured at a physical layer. In this case, the SRS configuration 1 may refer to (comb0, CS0), and configuration 2 may refer to (comb1, CS4), and so on.

In an application scenario, it is assumed that the radio access device transmits DCI of two formats (formats), format 4 and format 1a, or Format 0 and format 1a, in a same subframe to a same terminal. In this case, for a periodic triggering of an SRS, the terminal needs to decide, in combination with multiple simultaneously received pieces of DCI, an SRS configuration.

Instance (1)

For example, if DCI of format 1a and DCI of format 4 are transmitted in a same subframe, a receiver and a transmitter may perform processing according to the following method. The radio access device performs joint encoding on 1 bit in DCI of Format 1a and 2 bits in DCI of Format 4. The mapping relationships between the encoding and the SRS configurations may be as shown in Table 4:

TABLE 4

| State of Format 4 | State of Format 1a | Configuration |
|---|---|---|
| 00 | 0 | Off |
| 00 | 1 | SRS configuration 5 |
| 01 | 0 | SRS configuration 1 |
| 01 | 1 | New SRS configuration (SRS configuration 6) |
| 10 | 0 | SRS configuration 2 |
| 10 | 1 | New SRS configuration (SRS configuration 7) |
| 11 | 0 | SRS configuration 3 |
| 11 | 1 | New SRS configuration (SRS configuration 8) |

At the receiver, the terminal obtains two pieces of DCI by parsing, and then in combination with values of SRS configuration information elements of the two pieces of DCI, determines the corresponding SRS configuration. For example, if the terminal determines, by parsing, that the information carried in the SRS configuration information element of DCI of format 4 is "10", while the information carried in the SRS configuration information element of DCI of format 1a is "1", the terminal determines that the SRS configuration indicated by the radio access device is SRS configuration 7; correspondingly, the terminal may transmit an SRS to the radio access device according to SRS configuration 7.

Because other SRS configuration parameters are configured through higher layer signaling beforehand, the UE may transmit an SRS in combination with the SRS configuration determined by the two pieces of DCI and the SRS configuration obtained beforehand.

Similarly, if DCI of format 0 and DCI of format 1a are transmitted in a same subframe to a same terminal, the radio access device performs joint encoding on 1 bit in DCI of Format 0 and 1 bit in DCI of Format 1a. The mapping relationships between the encoding and the SRS configurations may be as shown in Table 5:

TABLE 5

| State of Format 0 | State of Format 1a | Configuration |
|---|---|---|
| 0 | 0 | Off |
| 0 | 1 | Configuration 5 |
| 1 | 0 | Configuration 4 |
| 1 | 1 | New configuration (configuration 6) |

The terminal may preset Table 4 and Table 5, for example, the terminal determines, by parsing, that the information carried in the SRS configuration information element of DCI of format 0 is "1", while the information carried in the SRS configuration information element of DCI of format 1a is "1", the terminal determines that the SRS configuration indicated by the radio access device is SRS configuration 6; correspondingly, the terminal may transmit an SRS to the radio access device according to SRS configuration 6.

It may be found that based on the joint encoding mechanism for the SRS configuration information elements of DCI of different formats as shown in Table 4 or Table 5, in a subframe, the total number of bits which may be used to indicate SRS configurations is increased, and the radio access device may select a more reasonable configuration for optimizing SRS transmission.

In an actual application, in view of detection reliability, some SRS configurations in Table 5 and Table 6 may be the same (for example, SRS configuration 6 and SRS configuration 4 may be a same configuration), and some SRS configurations may be set to invalid.

Instance (2)

In an application scenario, if DCI of multiple formats is transmitted in a same subframe to a same terminal, indication priorities of various formats may be agreed. Of course, one format therein has the highest indication priority. If the terminal receives DCI of at least two formats from the same subframe, the terminal performs a configuration according to the indication of the SRS configuration information element in the DCI of the Format of the highest indication priority after comparing indication priorities of DCI of various formats. Of course, the method for performing an SRS configuration according to the DCI of the format of the highest indication priority selected from DCI of at least two formats may also be regarded as a special method for indicating an SRS configuration by joint encoding of SRS configuration information elements of DCI of at least two formats in the same subframe.

For example, assuming that DCI of Format 4 and DCI of format 1a may be delivered in a subframe, then, if it is agreed that Format 4 is the Format of the highest indication priority, the mapping relationships may still be as shown in Table 1 when the radio access device separately uses DCI of format 4 for triggering, and the mapping relationships may still be as shown in Table 3 when the radio access device separately uses DCI of format 1a for indicating an SRS configuration.

Then, if the radio access device transmits DCI of format 4 and DCI of format 1a in a subframe, the mapping relationships between the joint encoding values of SRS configuration information elements and the SRS configurations may be as shown in Table 6:

TABLE 6

| State of Format 4 | State of Format 1a | Configuration |
|---|---|---|
| 00 | 0 | Off |
| 00 | 1 | Off |
| 01 | 0 | Configuration 1 |
| 01 | 1 | Configuration 1 |
| 10 | 0 | Configuration 2 |
| 10 | 1 | Configuration 2 |
| 11 | 0 | Configuration 3 |
| 11 | 1 | Configuration 3 |

Therefore, after the terminal receives DCI of format4 and DCI of format1a from the same subframe, the terminal performs an SRS configuration only according to the indication of DCI of format 4, but does not consider the specific value of the SRS configuration information element of DCI of format 1a. In this way, as compared with the indication method in Table 4 or Table 5, types of SRS configurations that can be indicated the radio access device are fewer, but because the SRS configuration is performed according to the indication of DCI of the highest indication priority (format 4), even if format 1a is not detected, the final configuration is not affected.

Similarly, assuming that DCI of format 0 and DCI of format1a may be delivered in a subframe, then, if it is agreed that format 0 is the Format of the highest indication priority, the mapping relationships may still be as shown in Table 2 when the radio access device separately uses DCI of format 0 for triggering, and the mapping relationships may still be as shown in Table 3 when the radio access device separately uses DCI of format 1a for triggering.

Then, if the radio access device transmits DCI of format 0 and DCI of format 1a in a subframe, the mapping relationships between the joint encoding values of SRS configuration information elements and the SRS configurations may be as shown in Table 7:

TABLE 7

| State of Format 0 | State of Format 1a | Configuration |
|---|---|---|
| 0 | 0 | Off |
| 0 | 1 | Off |
| 1 | 0 | Configuration 4 |
| 1 | 1 | Configuration 4 |

To further reduce the probability of an error, when delivering multiple pieces of DCI of different formats in a same subframe, the radio access device may also set the SRS configuration information elements of DCI of other formats than the format of the highest indication priority to an "off" state, and only use DCI of the format of the highest indication priority to indicate the specific SRS configuration. In this scenario, Table 6 and Table 7 may be restructured to the following Table 8 and Table 9.

For example, if the radio access device transmits DCI of format 4 and DCI of format 1a in a subframe, the mapping relationships between the joint encoding values of SRS configuration information elements and the SRS configurations may be as shown in Table 8:

TABLE 8

| State of Format 4 | State of Format 1a | Configuration |
| --- | --- | --- |
| 00 | 0 | Off |
| 00 | 1 | Error |
| 01 | 0 | Configuration 1 |
| 01 | 1 | Error |
| 10 | 0 | Configuration 2 |
| 10 | 1 | Error |
| 11 | 0 | Configuration 3 |
| 11 | 1 | Error |

For example, if the radio access device transmits DCI of format 0 and DCI of format 1a in a subframe, the mapping relationships between the joint encoding values of SRS configuration information elements and the SRS configurations may be as shown in Table 9:

TABLE 9

| State of Format 0 | State of Format 1a | Configuration |
| --- | --- | --- |
| 0 | 0 | Off |
| 0 | 1 | Error |
| 1 | 0 | Configuration 4 |
| 1 | 1 | Error |

In this scenario, if the terminal receives DCI of multiple formats from a subframe and detects that the SRS configuration information elements of DCI of formats of lower indication priorities are not in the "off" state, the terminal may determine an error of receiving and does not transmit an SRS to the radio access device temporarily. In this way, when other formats than the format of the highest indication priority are in the off state (indicating an error of receiving), the terminal does not transmit an SRS because of a configuration error, so as to avoid transmitting an SRS according to an erroneous SRS configuration and avoid unnecessary interference.

To further reduce the probability of an error, if DCI of the Format of a low indication priority and the DCI of the Format of a high indication priority may indicate a same SRS configuration, then, when two pieces of DCI of the formats both indicate the SRS configuration, it may be expressed that they jointly indicate the SRS configuration (in this case, it is not required that the SRS configuration information element of DCI of the Format of the low indication priority is set to an off state). In this way, in the case that DCI of Formats of different indication priorities indicates a same SRS configuration, as long as the terminal correctly demodulates DCI of one of the formats, the SRS can be transmitted according to the correct configuration.

For example, when DCI of format 1a is separately used to indicate an SRS configuration, a mapping table may be as shown in Table 3, and configuration 5, configuration 1 (Table 1), and configuration 4 (Table 2) may indicate a same SRS configuration. In this scenario, Table 8 and Table 9 may be restructured to the following Table 10 and Table 11.

Then, if the radio access device transmits DCI of format 4 and DCI of format 1a in a subframe, the mapping relationships between the joint encoding values of SRS configuration information elements and the SRS configurations may be as shown in Table 10:

TABLE 10

| State of Format 4 | State of Format 1a | Configuration |
| --- | --- | --- |
| 00 | 0 | Off |
| 00 | 1 | Error |
| 01 | 0 | Configuration 1 (configuration 4, configuration 5) |
| 01 | 1 | Configuration 1 (configuration 4, configuration 5) |
| 10 | 0 | Configuration 2 |
| 10 | 1 | Error |
| 11 | 0 | Configuration 3 |
| 11 | 1 | Error |

Then, if the radio access device transmits DCI of format 0 and DCI of format 1a in a subframe, the mapping relationships between the joint encoding values of SRS configuration information elements and the SRS configurations may be as shown in Table 11:

TABLE 11

| State of Format 0 | State of Format 1a | Configuration |
| --- | --- | --- |
| 0 | 0 | Off |
| 0 | 1 | Error |
| 1 | 0 | Configuration 1 (configuration 4, configuration 5) |
| 1 | 1 | Configuration 1 (configuration 4, configuration 5) |

The terminal may preset Table 6 and Table 7, or Table 8 and Table 9, or Table 10 and Table 11. For example, after obtaining the SRS configuration information elements of two pieces of DCI by parsing, the terminal determines, according to the mapping relationships in the mapping table, an SRS configuration indicated by the radio access device, and the terminal may transmit an SRS to the radio access device according to the SRS configuration.

Instance (3)

If two pieces of DCI of formats may be delivered in a same subframe to a same terminal, the radio access device may use either one of the two pieces of DCI to indicate an SRS configuration, and the other piece of DCI which does not indicate the SRS configuration is set to an off state, indicating no SRS configuration. Therefore, for example, when two pieces of DCI of formats both indicate an SRS configuration, it indicates erroneous indication; otherwise, it indicates correct indication.

Then, if the radio access device transmits DCI of format 4 and DCI of format 1a in a subframe, the mapping relationships between the joint encoding values of SRS configuration information elements and the SRS configurations may be as shown in Table 12:

TABLE 12

| State of Format 4 | State of Format 1a | Configuration |
| --- | --- | --- |
| 00 | 0 | Off |
| 00 | 1 | Configuration 5 |

TABLE 12-continued

| State of Format 4 | State of Format 1a | Configuration |
|---|---|---|
| 01 | 0 | Configuration 1 |
| 01 | 1 | Error |
| 10 | 0 | Configuration 2 |
| 10 | 1 | Error |
| 11 | 0 | Configuration 3 |
| 11 | 1 | Error |

Then, if the radio access device transmits DCI of format 0 and DCI of format 1a in a subframe, the mapping relationships between the joint encoding values of SRS configuration information elements and the SRS configurations may be as shown in Table 13:

TABLE 13

| State of Format 0 | State of Format 1a | Configuration |
|---|---|---|
| 0 | 0 | Off |
| 0 | 1 | Configuration 5 |
| 1 | 0 | Configuration 4 |
| 1 | 1 | Error |

To further reduce the probability of an error, if DCI of different formats delivered in a same subframe indicates a same SRS configuration, then, when two pieces of DCI of formats both indicate the configuration, it may be expressed that they jointly indicate the SRS configuration (in this case, it is not required that the SRS configuration information element of DCI of one of the Formats is to an off state). In this way, in the case that DCI of different formats indicates a same SRS configuration, as long as the terminal correctly demodulates DCI of one of the formats, the SRS can be transmitted according to the correct configuration.

For example, when format 1a is separately used to indicate an SRS configuration, the mapping table is shown in Table 3, and configuration 5, configuration 1 (Table 1), and configuration 4 (Table 2) actually indicate a same configuration. In this case, Table 12 and Table 13 may be restructured to the following Table 14 and Table 15.

For example, if the radio access device transmits DCI of format 4 and DCI of format 1a in a subframe, the mapping relationships between the joint encoding values of SRS configuration information elements and the SRS configurations may be as shown in Table 14:

TABLE 14

| State of Format 4 | State of Format 1a | Configuration |
|---|---|---|
| 00 | 0 | Off |
| 00 | 1 | Configuration 1 (configuration 4, configuration 5) |
| 01 | 0 | Configuration 1 (configuration 4, configuration 5) |
| 01 | 1 | Configuration 1 (configuration 4, configuration 5) |
| 10 | 0 | Configuration 2 |
| 10 | 1 | Error |
| 11 | 0 | Configuration 3 |
| 11 | 1 | Error |

For example, if the radio access device transmits DCI of format 0 and DCI of format 1a in a subframe, the mapping relationships between the joint encoding values of SRS configuration information elements and the SRS configurations may be as shown in Table 15:

TABLE 15

| State of Format 0 | State of Format 1a | Configuration |
|---|---|---|
| 0 | 0 | Off |
| 0 | 1 | Configuration 1 (configuration 4, configuration 5) |
| 1 | 0 | Configuration 1 (configuration 4, configuration 5) |
| 1 | 1 | Configuration 1 (configuration 4, configuration 5) |

To further reduce the probability of an error, if DCI of different formats may indicate a same SRS configuration, then, only when two pieces of DCI of the formats both indicate an SRS configuration, they represent correct indication; otherwise, they represent erroneous indication. In this case, Table 14 and Table 15 may be restructured to the following Table 16 and Table 17.

For example, if the radio access device transmits DCI of format 4 and DCI of format 1a in a subframe, the mapping relationships between the joint encoding values of SRS configuration information elements and the SRS configurations may be as shown in Table 16:

TABLE 16

| State of Format 4 | State of Format 1a | Configuration |
|---|---|---|
| 00 | 0 | Off |
| 00 | 1 | Error |
| 01 | 0 | Error |
| 01 | 1 | Configuration 1 (configuration 4, configuration 5) |
| 10 | 0 | Configuration 2 |
| 10 | 1 | Error |
| 11 | 0 | Configuration 3 |
| 11 | 1 | Error |

Then, if the radio access device transmits DCI of format 0 and DCI of format 1a in a subframe, the mapping relationships between the joint encoding values of SRS configuration information elements and the SRS configurations may be as shown in Table 17:

TABLE 17

| State of Format 0 | State of Format 1a | Configuration |
|---|---|---|
| 0 | 0 | Off |
| 0 | 1 | Error |
| 1 | 0 | Error |
| 1 | 1 | Configuration 1 (configuration 4, configuration 5) |

The terminal may preset Table 12 and Table 13, or Table 14 and Table 15, or Table 16 and Table 17. For example, after obtaining the SRS configuration information elements of two pieces of DCI by parsing, the terminal determines, according to the mapping relationships in the mapping table, an SRS configuration indicated by the radio access device, and the terminal may transmit an SRS to the radio access device according to the SRS configuration.

In addition, different combinations of DCI of formats may use different joint encoding indication solutions. For example, when DCI of format 4 and DCI of format 1a are delivered in a same subframe, the indication solution shown in Table 8 or Table 10 is used, while the indication solution shown in Table 17 is used when format0 and format1 a are transmitted simultaneously.

As seen above, the radio access device in the embodiment generates two pieces of DCI and transmits the two pieces of DCI in a same subframe to the terminal, so as to use the SRS configuration information elements in the two pieces of DCI to jointly indicate an SRS configuration. Because the radio access device uses the SRS configuration information elements in multiple pieces of DCI to jointly indicate an SRS configuration, the SRS configuration information elements in the multiple pieces of DCI may be coordinated to indicate a uniquely determined SRS configuration, and accuracy and flexibility of indicating an SRS configuration may be improved.

Further, multiple implementation manners provided by this embodiment may be selected flexibly to satisfy requirements of different application scenarios.

For better implementing the technical solutions of the above embodiments, an embodiment of the present invention further provides a device for implementing the above technical solutions.

Figure 3:
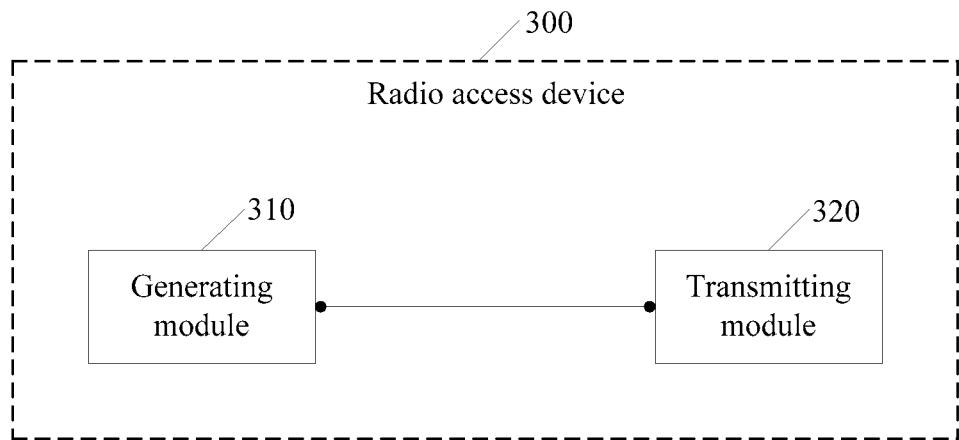
FIG. 3 is a schematic diagram of a radio access device according to an embodiment of the present invention.

As shown in FIG. 3, a radio access device 300 provided by an embodiment of the present invention may include: a generating module 310 and a transmitting module 320.

The generating module 310 is configured to generate at least two pieces of downlink control signaling DCI, where each of the at least two pieces of DCI includes a sounding reference signal SRS configuration information element; and the generating module 310 may be a processor.

The transmitting module 320 is configured to transmit the at least two pieces of DCI in a subframe to a terminal, so that the SRS configuration information elements in the at least two pieces of DCI are used to jointly indicate an SRS configuration; and the transmitting module 320 may be an interface.

In an actual application, there are various methods for using the SRS configuration information elements in the at least two generated pieces of DCI by the radio access device 300 to jointly indicate an SRS configuration, for example, using a joint encoding result of the SRS configuration information elements in the at least two pieces of DCI generated according to a preset joint encoding rule to jointly indicate an SRS configuration, and joining and combining the SRS configuration information elements in the at least two pieces of DCI (the order of joining and combining may be agreed or indicated), where different values of multiple joined and combined bits correspondingly indicate corresponding SRS configurations (for example, joining and combining SRS configuration information elements of 3 bits included in two pieces of DCI, where different values of the 3 joined and combined bits may indicate at most 8 different SRS configurations); or using an SRS configuration indicated by the SRS configuration information element of one piece (or more pieces) of DCI in the at least two generated pieces of DCI (while the SRS configuration information elements in the remaining DCI are set to invalid, or are used as a reference condition for determining whether the jointly indicated SRS configuration is valid) as the SRS configuration jointly indicated by the SRS configuration information elements in the at least two generated pieces of DCI. However, no matter which combined indication method is selected, because the SRS configuration information elements in the at least two pieces of DCI are used for joint indication, the SRS configuration information elements in the at least two pieces of DCI may be coordinated and unified to indicate a uniquely determined SRS configuration (which may be valid or invalid), and two parties may finally obtain a determined indication result according to an agreed mapping relationship which does not cause configuration confusion.

For example, the generating module 310 may generate at least two pieces of DCI having different indication priorities, and use the SRS configuration information element of DCI of the highest indication priority in the at least two pieces of DCI to indicate an SRS configuration, that is, use an SRS configuration indicated by the SRS configuration information element of DCI of the highest indication priority in the at least two pieces of DCI having different indication priorities as the SRS configuration jointly indicated by the SRS configuration information elements in the at least two pieces of DCI having different indication priorities, while the SRS configuration information elements of other DCI than the DCI of the highest indication priority in the at least two pieces of DCI may be regarded as invalid.

In addition, when the SRS configuration information elements of other DCI than DCI of the highest indication priority in the at least two pieces of DCI and the SRS configuration information element of DCI of the highest indication priority indicate a same SRS configuration, the same SRS configuration is used as the SRS configuration jointly indicated by the SRS configuration information elements in the at least two pieces of DCI; and when the SRS configuration information elements of other DCI than DCI of the highest indication priority in the at least two pieces of DCI and the SRS configuration information element of DCI of the highest indication priority indicate different SRS configurations, the SRS configuration information elements in the at least two pieces of DCI jointly indicate an invalid SRS configuration.

For another example, the generating module 310 may generate at least two pieces of DCI of different indication priorities, where: if the SRS configuration information elements of other DCI than DCI of the highest indication priority in the at least two pieces of DCI having different indication priorities are set to an invalid state (for example, an off state or other agreed invalid states), namely, a state indicating no SRS configuration, the SRS configuration indicated by the SRS configuration information element of DCI of the highest indication priority may be used as the SRS configuration jointly indicated by the SRS configuration information elements in the at least two pieces of DCI having different indication priorities; and when the SRS configuration information elements of other DCI than DCI of the highest indication priority in the at least two pieces of DCI also indicate an SRS configuration, the SRS configuration information elements in the at least two pieces of DCI jointly indicate an invalid SRS configuration.

For another example, the generating module 310 may generate at least two pieces of DCI of the same or different formats, where: when the SRS configuration information element of only one piece of DCI in the at least two pieces of DCI indicates an SRS configuration (the SRS configuration information elements of the remaining DCI are in an invalid state), the SRS configuration indicated by the SRS configuration information element of the one piece of DCI is used as the SRS configuration jointly indicated by the SRS configuration information elements in the at least two pieces of DCI; and when the SRS configuration information elements of the at least two pieces of DCI all indicate an SRS configuration the SRS configuration information elements in the at least two pieces of DCI jointly indicate an invalid SRS configuration.

For another example, the generating module 310 may generate at least two pieces of DCI of the same or different formats, where: when the SRS configuration information element of only one piece of DCI in the at least two pieces of DCI indicates an SRS configuration (the SRS configuration information elements of the remaining DCI are in an invalid state), the SRS configuration indicated by the SRS configuration information element of the one piece of DCI is used as the SRS configuration jointly indicated by the SRS configuration information elements in the at least two pieces of DCI; when the SRS configuration information elements of the at least two pieces of DCI all indicate a same SRS configuration, the same SRS configuration is used as the SRS configuration jointly indicated by the SRS configuration information elements in the at least two pieces of DCI; and when the SRS configuration information elements of the at least two pieces of DCI indicate different SRS configurations, the SRS configuration information elements in the at least two pieces of DCI jointly indicate an invalid SRS configuration.

For another example, the generating module 310 may generate two pieces of DCI of the same or different formats, where: if an SRS configuration indicated by the SRS configuration information element of one piece of DCI in the two pieces of DCI is an SRS configuration in SRS configurations that can be indicated by the SRS configuration information element of the other piece of DCI, then, when the SRS configuration information element of the one piece of DCI and the SRS configuration information element of the other piece of DCI indicate a same SRS configuration, the same SRS configuration is used as the SRS configuration jointly indicated by the SRS configuration information elements in the two pieces of DCI, and when the SRS configuration information element of the one piece of DCI and the SRS configuration information of the other piece of DCI indicate different SRS configurations, the SRS configuration information elements in the two pieces of DCI jointly indicate an invalid SRS configuration; and if an SRS configuration indicated by the SRS configuration information element of one piece of DCI in the two pieces of DCI is an SRS configuration that cannot be indicated by the SRS configuration information element of the other piece of DCI, then, when the SRS configuration information element of the other piece of DCI indicates an SRS configuration, the SRS configuration information elements in the two pieces of DCI jointly indicate an invalid SRS configuration, and when the SRS configuration information element of the other piece of DCI is set to an invalid state, the SRS configuration indicated by the SRS configuration information element of the one piece of DCI is used as the SRS configuration jointly indicated by the SRS configuration information elements in the two pieces of DCI.

The terminal may determine, according to the mapping relationship corresponding thereto, an SRS configuration jointly indicated by the SRS configuration information elements in the two pieces of DCI.

It may be understood that the radio access device 300 of this embodiment may be the radio access device in the above method embodiments and may be used to implement all technical solutions of the above method embodiments and that a function of each functional module can be implemented according to the method in the above method embodiments. The specific implementation process is not described herein. For details, reference may be made to the related description in the above embodiments.

As seen above, the radio access device 300 in the embodiment generates at least two pieces of DCI and transmits the at least two pieces of DCI in a same subframe to the terminal, so as to use the SRS configuration information elements in the at least two pieces of DCI to jointly indicate an SRS configuration. Because the radio access device uses the SRS configuration information elements in multiple pieces of DCI to jointly indicate an SRS configuration, the SRS configuration information elements in the multiple pieces of DCI may be coordinated to indicate a uniquely determined SRS configuration, and accuracy and flexibility of indicating an SRS configuration may be improved.

Figure 4:
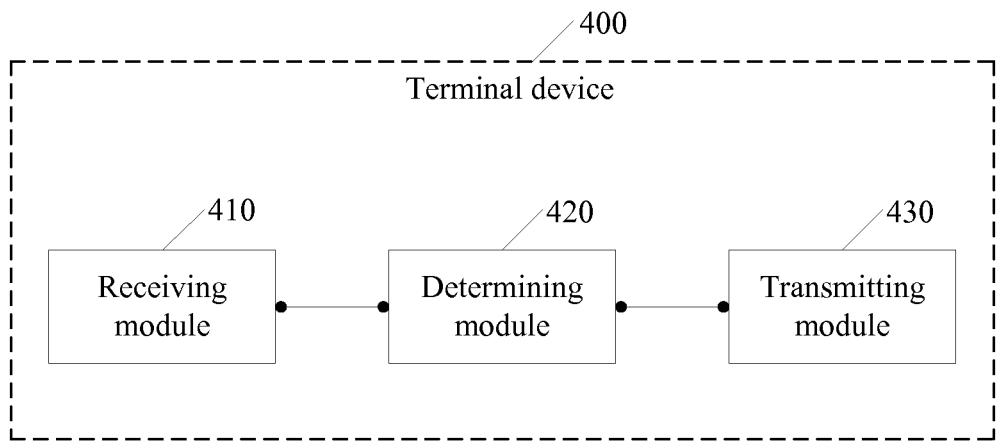
FIG. 4 is a schematic diagram of a terminal device according to an embodiment of the present invention.

As shown in FIG. 4, a terminal device 400 provided by an embodiment of the present invention may include: a receiving module 410, a determining module 420, and a transmitting module 430.

The receiving module 410 is configured to receive at least two pieces of DCI transmitted in a subframe by a radio access device, where each of the at least two pieces of DCI includes a sounding reference signal SRS configuration information element; and the receiving module 410 may be an interface.

The determining module 420 is configured to determine an SRS configuration indicated jointly by the SRS configuration information elements in the at least two pieces of DCI received by the receiving module 410; and the determining module 420 may be a processor.

The transmitting module 430 is configured to transmit an SRS to the radio access device according to the SRS configuration determined by the determining module 420; and the transmitting module 430 may be an interface.

In an application scenario, if the at least two pieces of DCI received by the receiving module 410 have different indication priorities, the determining module 420 may include: a comparing submodule and a determining submodule (not illustrated in FIG. 4).

The comparing submodule is configured to compare the indication priorities of the at least two pieces of DCI received by the receiving module 410.

The determining submodule is configured to: determine, according to the comparison by the comparing submodule, an SRS configuration indicated by the SRS configuration information element of DCI of the highest indication priority in the at least two pieces of DCI as the SRS configuration jointly indicated by the SRS configuration information elements in the at least two pieces of DCI; or when the SRS configuration information elements of other DCI than DCI of the highest indication priority in the at least two pieces of DCI received by the receiving module are set to an invalid state, determine, according to the comparison by the comparing submodule, an SRS configuration indicated by the SRS configuration information element of DCI of the highest indication priority in the at least two pieces of DCI as the SRS configuration jointly indicated by the SRS configuration information elements in the at least two pieces of DCI.

In another application scenario, if the receiving module 410 receives at least two pieces of DCI having different indication priorities, the determining module 420 may compare the indication priorities of the at least two pieces of DCI; and if the SRS configuration information elements of other DCI than DCI of the highest indication priority in the at least two pieces of DCI are set to an invalid state (for example, an off state or other agreed invalid states), determine, according to the comparison, an SRS configuration indicated by the SRS configuration information element of DCI of the highest indication priority in the at least two pieces of DCI as the SRS configuration jointly indicated by the SRS configuration information elements in the at least two pieces of DCI. In addition, if the SRS configuration information elements of other DCI than DCI of the highest indication priority in the at least two pieces of DCI are set to a valid state (namely, a state indicating an SRS configuration), the determining module 420 may further determine whether the SRS configuration information element of DCI of the highest indication priority and the SRS configuration information elements of other DCI than DCI of the highest indication priority indicate a same SRS configuration, and if so, determine that the same SRS configuration is the SRS configuration jointly indicated by the SRS configuration information elements in the at least two pieces of DCI; if not (namely, the SRS configuration information elements of the at least two pieces of DCI indicate different SRS configurations), determine that the SRS configuration information elements in the at least two pieces of DCI jointly indicate an invalid SRS configuration.

In another application scenario, if the receiving module 410 receives at least two pieces of DCI of the same or different formats, the determining module 420 may determine whether the SRS configuration information element of only one piece of DCI in the at least two pieces of DCI indicates an SRS configuration (that is, the SRS configuration information elements of the remaining DCI are in an invalid state), and if so, determine the SRS configuration indicated by the SRS configuration information element of the only one piece of DCI as the SRS configuration jointly indicated by the SRS configuration information elements in the at least two pieces of DCI; if not (that is, when the SRS configuration information elements of the at least two pieces of DCI all indicate an SRS configuration, determine that the SRS configuration information elements in the at least two pieces of DCI jointly indicate an invalid SRS configuration.

In another application scenario, if the receiving module 410 receives at least two pieces of DCI of the same or different formats, the determining module 420 may determine whether the SRS configuration information element of only one piece of DCI in the at least two pieces of DCI indicates an SRS configuration (the SRS configuration information elements of the remaining DCI are in an invalid state), and if so, determine the SRS configuration indicated by the SRS configuration information element of the only one piece of DCI as the SRS configuration jointly indicated by the SRS configuration information elements in the at least two pieces of DCI; if not (that is, when the SRS configuration information elements of the at least two pieces of DCI all indicate an SRS configuration), the determining module 420 may further determine whether the SRS configuration information elements of the at least two pieces of DCI indicate a same SRS configuration, and if so, determine that the same SRS configuration is the SRS configuration jointly indicated by the SRS configuration information elements in the at least two pieces of DCI; if not (that is, the SRS configuration information elements of the at least two pieces of DCI indicate different SRS configurations), determine that the SRS configuration information elements in the at least two pieces of DCI jointly indicate an invalid SRS configuration.

In another application scenario, if the receiving module 410 receives two pieces of DCI of the same or different formats, and an SRS configuration indicated by the SRS configuration information element of one piece of DCI in the two pieces of DCI is an SRS configuration in SRS configurations that can be indicated by the SRS configuration information element of the other piece of DCI, the determining module 420 may determine whether the SRS configuration information element of the one piece of DCI and the SRS configuration information element of the other piece of DCI indicate a same SRS configuration, and if so, determine that the same SRS configuration is the SRS configuration jointly indicated by the SRS configuration information elements in the two pieces of DCI; if not (that is, the SRS configuration information element of the one piece of DCI and the SRS configuration information of the other piece of DCI indicate different SRS configurations), determine that the SRS configuration information elements in the two pieces of DCI jointly indicate an invalid SRS configuration. In addition, if an SRS configuration indicated by the SRS configuration information element of one piece of DCI in the two pieces of DCI is an SRS configuration that cannot be indicated by the SRS configuration information element of the other piece of DCI, the determining module 420 may further determine whether the SRS configuration information element of the other piece of DCI also indicates an SRS configuration, and if so, determine that the SRS configuration information elements in the two pieces of DCI jointly indicate an invalid SRS configuration; if not, determine the SRS configuration indicated by the SRS configuration information element of the one piece of DCI as the SRS configuration jointly indicated by the SRS configuration information elements in the two pieces of DCI.

It may be understood that the terminal device 400 of this embodiment may be the terminal in the above method embodiments and may be used to implement all technical solutions of the above method embodiments and the function of each functional module can be implemented according to the method in the above method embodiments. The specific implementation process is not described herein. For details, reference may be made to the related description in the above embodiments.

As seen above, the radio access device in the embodiment generates at least two pieces of DCI and transmits the at least two pieces of DCI in a same subframe to the terminal device 400, so as to use the SRS configuration information elements in the at least two pieces of DCI to jointly indicate an SRS configuration. Because the radio access device uses the SRS configuration information elements in multiple pieces of DCI to jointly indicate an SRS configuration, the SRS configuration information elements in the multiple pieces of DCI may be coordinated to indicate a uniquely determined SRS configuration, and the terminal device 400 may transmit, after determining an SRS configuration jointly indicated by the SRS configuration information elements in at least two received pieces of DCI, an SRS to the radio access device according to the determined SRS configuration. The solution may improve accuracy and flexibility of indicating an SRS configuration.

Figure 5:
FIG. 5 is a schematic diagram of a communication system according to an embodiment of the present invention.

As shown in FIG. 5, a communication system provided by an embodiment of the present invention may include: a radio access device 510 and a terminal device 520.

The radio access device 500 is configured to generate at least two pieces of downlink control signaling DCI, where each of the at least two pieces of DCI includes a sounding reference signal SRS configuration information element; and transmit the at least two pieces of DCI in a subframe to the terminal, so that the SRS configuration information elements in the at least two pieces of DCI are used to jointly indicate an SRS configuration.

The terminal device 520 is configured to receive the at least two pieces of DCI transmitted in the subframe by the radio access device 510, where each of the at least two pieces of DCI includes a sounding reference signal SRS configuration information element; determine the SRS configuration indicated jointly by the SRS configuration information elements in the at least two pieces of DCI; and transmit an SRS to the radio access device 510 according to the determined SRS configuration.

In an actual application, there are various methods for using the SRS configuration information elements in the at least two generated pieces of DCI by the radio access device 510 to jointly indicate an SRS configuration, for example, using a joint encoding result of the SRS configuration information elements in the at least two pieces of DCI generated according to a preset joint encoding rule to jointly indicate an SRS configuration, and joining and combining the SRS configuration information elements in the at least two pieces of DCI (the order of joining and combining may be agreed or indicated), where different values of multiple joined and combined bits correspondingly indicate corresponding SRS configurations (for example, joining and combining SRS configuration information elements of 3 bits included in two pieces of DCI, where different values of the 3 joined and combined bits may indicate at most 8 different SRS configurations); or using an SRS configuration indicated by the SRS configuration information element of one piece (or more pieces) of DCI in the at least two generated pieces of DCI (while the SRS configuration information elements in the remaining DCI are set to invalid, or are used as a reference condition for determining whether the jointly indicated SRS configuration is valid) as the SRS configuration jointly indicated by the SRS configuration information elements in the at least two generated pieces of DCI. However, no matter which combined indication method is selected, because the SRS configuration information elements in the at least two pieces of DCI are used for joint indication, the SRS configuration information elements in the at least two pieces of DCI may be coordinated and unified to indicate a uniquely determined SRS configuration (which may be valid or invalid), and two parties may finally obtain a determined indication result according to an agreed mapping relationship which does not cause configuration confusion.

For example, the radio access device 510 may generate at least two pieces of DCI having different indication priorities, and use the SRS configuration information element of DCI of the highest indication priority in the at least two pieces of DCI to indicate an SRS configuration, that is, use an SRS configuration indicated by the SRS configuration information element of DCI of the highest indication priority in the at least two pieces of DCI having different indication priorities as the SRS configuration jointly indicated by the SRS configuration information elements in the at least two pieces of DCI having different indication priorities, while the SRS configuration information elements of other DCI than the DCI of the highest indication priority in the at least two pieces of DCI may be regarded as invalid.

In addition, when the SRS configuration information elements of other DCI than DCI of the highest indication priority in the at least two pieces of DCI and the SRS configuration information element of DCI of the highest indication priority indicate a same SRS configuration, the same SRS configuration is used as the SRS configuration jointly indicated by the SRS configuration information elements in the at least two pieces of DCI; and when the SRS configuration information elements of other DCI than DCI of the highest indication priority in the at least two pieces of DCI and the SRS configuration information element of DCI of the highest indication priority indicate different SRS configurations, the SRS configuration information elements in the at least two pieces of DCI jointly indicate an invalid SRS configuration.

For another example, the radio access device 510 may generate at least two pieces of DCI of different indication priorities, where: if the SRS configuration information elements of other DCI than DCI of the highest indication priority in the at least two pieces of DCI having different indication priorities are set to an invalid state (for example, set to an off state or other agreed invalid states), namely, a state indicating no SRS configuration, the SRS configuration indicated by the SRS configuration information element of DCI of the highest indication priority may be used as the SRS configuration jointly indicated by the SRS configuration information elements in the at least two pieces of DCI having different indication priorities; and when the SRS configuration information elements of other DCI than DCI of the highest indication priority in the at least two pieces of DCI also indicate an SRS configuration, the SRS configuration information elements in the at least two pieces of DCI jointly indicate an invalid SRS configuration.

For another example, the radio access device 510 may generate at least two pieces of DCI of the same or different formats, where: when the SRS configuration information element of only one piece of DCI in the at least two pieces of DCI indicates an SRS configuration (the SRS configuration information elements of the remaining DCI are in an invalid state), the SRS configuration indicated by the SRS configuration information element of the only one piece of DCI is used as the SRS configuration jointly indicated by the SRS configuration information elements in the at least two pieces of DCI; and when the SRS configuration information elements of the at least two pieces of DCI all indicate an SRS configuration, the SRS configuration information elements in the at least two pieces of DCI jointly indicate an invalid SRS configuration.

For another example, the radio access device 510 may generate at least two pieces of DCI of the same or different formats, where: when the SRS configuration information element of only one piece of DCI in the at least two pieces of DCI indicates an SRS configuration (the SRS configuration information elements of the remaining DCI are in an invalid state), the SRS configuration indicated by the SRS configuration information element of the only one piece of DCI is used as the SRS configuration jointly indicated by the SRS configuration information elements in the at least two pieces of DCI; when the SRS configuration information elements of the at least two pieces of DCI all indicate a same SRS configuration, the same SRS configuration is used as the SRS configuration jointly indicated by the SRS configuration information elements in the at least two pieces of DCI; and when the SRS configuration information elements of the at least two pieces of DCI indicate different SRS configurations, the SRS configuration information elements in the at least two pieces of DCI jointly indicate an invalid SRS configuration.

For another example, the radio access device 510 may generate two pieces of DCI of the same or different formats, where: if an SRS configuration indicated by the SRS configuration information element of one piece of DCI in the two pieces of DCI is an SRS configuration in SRS configurations that can be indicated by the SRS configuration information element of the other piece of DCI, then, when the SRS configuration information element of the one piece of DCI and the SRS configuration information element of the other piece of DCI indicate a same SRS configuration, the same SRS configuration is used as the SRS configuration jointly indicated by the SRS configuration information elements in the two pieces of DCI, and when the SRS configuration information element of the one piece of DCI and the SRS configuration information of the other piece of DCI indicate different SRS configurations, the SRS configuration information elements in the two pieces of DCI jointly indicate an invalid SRS configuration; and if an SRS configuration indicated by the SRS configuration information element of one piece of DCI in the two pieces of DCI is an SRS configuration that cannot be indicated by the SRS configuration information element of the other piece of DCI, then, when the SRS configuration information element of the other piece of DCI indicates an SRS configuration, the SRS configuration information elements in the two pieces of DCI jointly indicate an invalid SRS configuration, and when the SRS configuration information element of the other piece of DCI is set to an invalid state, the SRS configuration indicated by the SRS configuration information element of the one piece of DCI is used as the SRS configuration jointly indicated by the SRS configuration information elements in the two pieces of DCI.

The terminal device 520 may determine, according to the mapping relationship corresponding thereto, an SRS configuration jointly indicated by the SRS configuration information elements in the two pieces of DCI.

It may be understood that the radio access device 510 of this embodiment may be the radio access device in the above method embodiments, and the terminal device 520 may be the terminal in the above method embodiments. The two devices may be cooperated to implement all technical solutions of the above method embodiments and the function of each functional module can be implemented according to the method in the above method embodiments. The specific implementation process is not described herein. For details, reference may be made to the related description in the above embodiments.

An embodiment of the present invention further provides a communication system, which may include:

a radio access device 300 and/or a terminal device 400.

It should be noted that, for ease of description, each of the foregoing method embodiments is described as a series of actions. Those skilled in the art understand that the present invention is not limited to the sequence of actions described herein and some steps may be performed in other sequences or at the same time according to the present invention. In addition, those skilled in the art should learn that the embodiments in the specification are exemplary embodiments and actions and modules involved in these embodiments are not mandatory for the present invention.

In the foregoing embodiments, each embodiment has its respective emphasis. What is not detailed in one embodiment of the present invention is detailed in the related description of another embodiment.

To conclude, the radio access device in the embodiments of the present invention generates at least two pieces of DCI and transmits the at least two pieces of DCI in a same subframe to the terminal, so as to use the SRS configuration information elements in the at least two pieces of DCI to jointly indicate an SRS configuration. Because the radio access device uses the SRS configuration information elements in multiple pieces of DCI to jointly indicate an SRS configuration, the SRS configuration information elements in the multiple pieces of DCI may be coordinated to indicate a uniquely determined SRS configuration, and accuracy and flexibility of indicating an SRS configuration may be improved.

Persons of ordinary skill in the art may understand that all or part of the steps of the methods according to the embodiments may be implemented by a program instructing relevant hardware. The program may be stored in a computer readable storage medium, which can be a read only memory, a random access memory, a magnetic disk, or a CD-ROM.

A method for transmitting a sounding reference signal and a method, device, and system for indicating a configuration according to the embodiments of the present invention are described in detail above. Although the principle and implementation of the present invention are described with reference to exemplary embodiments, the embodiments are only intended to help understand the method and core idea of the present invention. In addition, with respect to the implementation and application scope of the present invention, modifications and variations may be made by persons of ordinary skill in the art according to the idea of the present invention. Therefore, the content of the specification shall not be construed as a limitation on the present invention.

What is claimed is:

1. A method for indicating a sounding reference signal (SRS) configuration, comprising:

generating at least two pieces of downlink control signaling DCI, wherein each of the at least two pieces of DCI comprises a sounding reference signal SRS configuration information element; and transmitting the at least two pieces of DCI in a subframe to a terminal, for using the SRS configuration information elements in the at least two pieces of DCI to jointly indicate an SRS configuration, wherein using the SRS configuration information elements in the at least two pieces of DCI to jointly indicate the SRS configuration comprises:

when an SRS configuration information element of only one piece of DCI in the at least two pieces of DCI indicates the SRS configuration, using the SRS configuration indicated by the SRS configuration information element of the one piece of DCI as the SRS configuration jointly indicated by the SRS configuration information elements in the at least two pieces of DCI; and when the SRS configuration information elements of the at least two pieces of DCI all indicate the SRS configuration, the SRS configuration information elements in the at least two pieces of DCI jointly indicating an invalid SRS configuration.

2. The method according to claim 1, wherein using the SRS configuration information elements in the at least two pieces of DCI to jointly indicate the SRS configuration comprises:

using a joint encoding result of the SRS configuration information elements in the at least two pieces of DCI to jointly indicate the SRS configuration.

3. The method according to claim 1, wherein using the SRS configuration information elements in the at least two pieces of DCI to jointly indicate the SRS configuration comprises:

using an SRS configuration information element of DCI of a highest indication priority in the at least two pieces of DCI to indicate the SRS configuration, wherein the at least two pieces of DCI have different indication priorities.

4. The method according to claim 3, wherein using the SRS configuration information elements in the at least two pieces of DCI to jointly indicate the SRS configuration further comprises:

when SRS configuration information elements of other DCI than DCI of the highest indication priority in the at least two pieces of DCI also indicate the SRS configuration, the SRS configuration information elements in the at least two pieces of DCI jointly indicating an invalid SRS configuration.

5. The method according to claim 3, wherein using the SRS configuration information elements in the at least two pieces of DCI to jointly indicate the SRS configuration further comprises:

when SRS configuration information elements of other DCI than DCI of the highest indication priority in the at least two pieces of DCI and the SRS configuration information element of DCI of the highest indication priority indicate a same SRS configuration, using the same SRS configuration as the SRS configuration jointly indicated by the SRS configuration information elements in the at least two pieces of DCI;

when SRS configuration information elements of other DCI than DCI of the highest indication priority in the at least two pieces of DCI and the SRS configuration information element of DCI of the highest indication priority indicate different SRS configurations, the SRS configuration information elements in the at least two pieces of DCI jointly indicating an invalid SRS configuration.

6. The method according to claim 1, wherein using the SRS configuration information elements in the at least two pieces of DCI to jointly indicate the SRS configuration comprises:

when an SRS configuration information element of only one piece of DCI in the at least two pieces of DCI indicates the SRS configuration, using the SRS configuration indicated by the SRS configuration information element of the one piece of DCI as the SRS configuration jointly indicated by the SRS configuration information elements in the at least two pieces of DCI;

when the SRS configuration information elements of the at least two pieces of DCI all indicate a same SRS configuration, using the same SRS configuration as the SRS configuration jointly indicated by the SRS configuration information elements in the at least two pieces of DCI;

when the SRS configuration information elements of the at least two pieces of DCI indicate different SRS configurations, the SRS configuration information elements in the at least two pieces of DCI jointly indicating an invalid SRS configuration.

7. The method according to claim 1, wherein:

the at least two pieces of DCI are two pieces of DCI, and using the SRS configuration information elements in the at least two pieces of DCI to jointly indicate the SRS configuration comprises:

when the SRS configuration indicated by an SRS configuration information element of one piece of DCI in the two pieces of DCI is an SRS configuration in SRS configurations that can be indicated by an SRS configuration information element of the other piece of DCI, determining whether the SRS configuration information element of the one piece of DCI and the SRS configuration information element of the other piece of DCI indicate a same SRS configuration, and performing one of: (a) using the same SRS configuration as the SRS configuration jointly indicated by SRS configuration information elements in the two pieces of DCI when the same SRS configuration is indicated, or (b) designating the SRS configuration information elements in the two pieces of DCI as jointly indicating an invalid SRS configuration when the same SRS configuration is not indicated.

8. A method for transmitting a sounding reference signal comprising:

receiving at least two pieces of DCI transmitted in a subframe by a radio access device, wherein each of the at least two pieces of DCI comprises a sounding reference signal SRS configuration information element;

determining an SRS configuration indicated jointly by the SRS configuration information elements in the at least two pieces of DCI; and transmitting an SRS to the radio access device according to the determined SRS configuration, wherein the determining an SRS configuration indicated jointly by the SRS configuration information elements in the at least two pieces of DCI comprises:

when an SRS configuration information element of only one piece of DCI in the at least two pieces of DCI indicates an SRS configuration, determining the SRS configuration indicated by the SRS configuration information element of the one piece of DCI as the SRS configuration jointly indicated by the SRS configuration information elements in the at least two pieces of DCI;

when the SRS configuration information elements of the at least two pieces of DCI all indicate an SRS configuration, determining that the SRS configuration information elements in the at least two pieces of DCI jointly indicate an invalid SRS configuration.

9. The method according to claim 8, wherein:

the at least two pieces of DCI have different indication priorities; and the determining an SRS configuration indicated jointly by the SRS configuration information elements in the at least two pieces of DCI comprises:

comparing the indication priorities of the at least two pieces of DCI; and determining, according to the comparison, an SRS configuration indicated by an SRS configuration information element of DCI of a highest indication priority in the at least two pieces of DCI as the SRS configuration jointly indicated by the SRS configuration information elements in the at least two pieces of DCI.

10. The method according to claim 8, wherein:

the at least two pieces of DCI have different indication priorities; and the determining an SRS configuration indicated jointly by the SRS configuration information elements in the at least two pieces of DCI comprises:

comparing the indication priorities of the at least two pieces of DCI; and as a result of said comparing that SRS configuration information elements of other DCI than DCI of a highest indication priority in the at least two pieces of DCI are in an invalid state, determining, according to the comparison, an SRS configuration indicated by an SRS configuration information element of DCI of the highest indication priority in the at least two pieces of DCI as the SRS configuration jointly indicated by the SRS configuration information elements in the at least two pieces of DCI.

11. The method according to claim 8, wherein the determining an SRS configuration indicated jointly by the SRS configuration information elements in the at least two pieces of DCI comprises:

determining an SRS configuration indicated by a joint encoding result of the SRS configuration information elements in the at least two pieces of DCI as the SRS configuration jointly indicated by the SRS configuration information elements in the at least two pieces of DCI.

12. The method according to claim 8, wherein the determining an SRS configuration indicated jointly by the SRS configuration information elements in the at least two pieces of DCI comprises:

when SRS configuration information elements of other DCI than DCI of a highest indication priority in the at least two pieces of DCI and an SRS configuration information element of DCI of the highest indication priority indicate a same SRS configuration, determining the same SRS configuration as the SRS configuration indicated jointly by the SRS configuration information elements in the at least two pieces of DCI;

when the SRS configuration information elements of other DCI than DCI of the highest indication priority in the at least two pieces of DCI and the SRS configuration information element of DCI of the highest indication priority indicate different SRS configurations, determining that the SRS configuration information elements in the at least two pieces of DCI jointly indicate an invalid SRS configuration.

13. The method according to claim 8, wherein the determining an SRS configuration indicated jointly by the SRS configuration information elements in the at least two pieces of DCI comprises:

when an SRS configuration information element of only one piece of DCI in the at least two pieces of DCI indicates an SRS configuration, determining the SRS configuration indicated by the SRS configuration information element of the one piece of DCI as the SRS configuration jointly indicated by the SRS configuration information elements in the at least two pieces of DCI;

when the SRS configuration information elements of the at least two pieces of DCI all indicate a same SRS configuration, determining the same SRS configuration as the SRS configuration jointly indicated by the SRS configuration information elements in the at least two pieces of DCI;

when the SRS configuration information elements of the at least two pieces of DCI indicate different SRS configurations, determining that the SRS configuration information elements in the at least two pieces of DCI jointly indicate an invalid SRS configuration.

14. The method according to claim 8, wherein:
the at least two pieces of DCI are two pieces of DCI, and the determining an SRS configuration indicated jointly by the SRS configuration information elements in the at least two pieces of DCI comprises:
when an SRS configuration indicated by an SRS configuration information element of one piece of DCI in the two pieces of DCI is an SRS configuration in SRS configurations that can be indicated by an SRS configuration information element of the other piece of DCI,
determining whether the SRS configuration information element of the one piece of DCI and the SRS configuration information element of the other piece of DCI indicate a same SRS configuration, and
performing one of: (a) determining the same SRS configuration as an SRS configuration jointly indicated by SRS configuration information elements in the two pieces of DCI when the same SRS configuration is indicated, or (b) determining that the SRS configuration information elements in the two pieces of DCI jointly indicate an invalid SRS configuration when the same SRS configuration is not indicated.

15. A radio access device, comprising:
a generating module, configured to generate at least two pieces of DCI, wherein each of the at least two pieces of DCI comprises a sounding reference signal SRS configuration information element; and
a transmitting module, configured to transmit the at least two pieces of DCI in a subframe to a terminal, so that the SRS configuration information elements in the at least two pieces of DCI are used to jointly indicate an SRS configuration,
wherein jointly indicating the SRS configuration comprises:
when an SRS configuration information element of only one piece of DCI in the at least two pieces of DCI indicates the SRS configuration, using the SRS configuration indicated by the SRS configuration information element of the one piece of DCI as the SRS configuration jointly indicated by the SRS configuration information elements in the at least two pieces of DCI; and
when the SRS configuration information elements of the at least two pieces of DCI all indicate the SRS configuration, the SRS configuration information elements in the at least two pieces of DCI jointly indicating an invalid SRS configuration.

16. A terminal device, comprising:
a receiving module, configured to receive at least two pieces of DCI transmitted in a subframe by a radio access device, wherein each of the at least two pieces of DCI comprises a sounding reference signal SRS configuration information element;
a determining module, configured to determine an SRS configuration indicated jointly by the SRS configuration information elements in the at least two pieces of DCI received by the receiving module; and
a transmitting module, configured to transmit an SRS to the radio access device according to the SRS configuration determined by the determining module,
wherein: the at least two pieces of DCI received by the receiving module have different indication priorities;
the determining module comprises:
a comparing submodule configured to compare the indication priorities of the at least two pieces of DCI received by the receiving module; and
a determining submodule, configured to: determine according to the comparison by the comparing submodule, an SRS configuration indicated by an SRS configuration information element of DCI of a highest indication priority in the at least two nieces of DCI as the SRS configuration jointly indicated by the SRS configuration information elements in the at least two pieces of DCI; or
when SRS configuration information elements of other DCI than DCI of a highest indication priority in the at least two pieces of DCI received by the receiving module are set to an invalid state, determine according to the comparison by the comparing submodule, an SRS configuration indicated by an SRS configuration information element of DCI of the highest indication priority in the at least two pieces of DCI as the SRS configuration jointly indicated by the SRS configuration information elements in the at least two pieces of DCI.

17. The method according to claim 1, wherein:
the at least two pieces of DCI are two pieces of DCI, and using the SRS configuration information elements in the at least two pieces of DCI to jointly indicate the SRS configuration comprises:
when an SRS configuration indicated by an SRS configuration information element of one piece of DCI in the two pieces of DCI is an SRS configuration that cannot be indicated by an SRS configuration information element of the other piece of DCI,
determining whether the SRS configuration information element of the other piece of DCI indicates an SRS configuration or is set to an invalid state, and
performing one of: (a) designating SRS configuration information elements in the two pieces of DCI as jointly indicating an invalid SRS configuration when as SRS configuration is indicated, or (b) using the SRS configuration indicated by the SRS configuration information element of the one piece of DCI as the SRS configuration jointly indicated by the SRS configuration information elements in the two pieces of DCI when the SRS configuration information element of the other piece of DCI is set of an invalid state.

18. The method according to claim 8, wherein:
the at least two pieces of DCI are two pieces of DCI, and the determining an SRS configuration indicated jointly by the SRS configuration information elements in the at least two pieces of DCI comprises:
when an SRS configuration indicated by an SRS configuration information element of one piece of DCI in the two pieces of DCI is an SRS configuration that cannot be indicated by an SRS configuration information element of the other piece of DCI, determining whether the SRS configuration information element of the other piece of DCI indicates an SRS configuration or is set to an invalid state, and performing one of: (a) determining that SRS configuration information elements in the two pieces of DCI jointly indicate an invalid SRS configuration when an SRS configuration is indicated, or (b) determining the SRS configuration indicated by the SRS configuration information element of the one piece of DCI as an SRS configuration jointly indicated by the SRS configuration information elements in the two pieces of DCI when the SRS configuration information element of the other piece of DCI is set to an invalid state.

* * * * *

UNITED STATES PATENT AND TRADEMARK OFFICE
CERTIFICATE OF CORRECTION

PATENT NO. : 9,313,679 B2
APPLICATION NO. : 13/895929
DATED : April 12, 2016
INVENTOR(S) : Li et al.

It is certified that error appears in the above-identified patent and that said Letters Patent is hereby corrected as shown below:

In the Claims

Column 34, line 21, "nieces" should read -- pieces --.

Column 34, line 57, "is set of an invalid state" should read -- is set to an invalid state --.

Signed and Sealed this
Fourteenth Day of June, 2016

Michelle K. Lee
*Director of the United States Patent and Trademark Office*